United States Patent
Luo et al.

(10) Patent No.: US 7,430,190 B2
(45) Date of Patent: Sep. 30, 2008

(54) SYSTEMS AND METHODS FOR RESOURCE ALLOCATION TO MULTIPLE ANTENNA ARRAYS FOR MAINTAINING A CONSTANT BIT RATE (CBR) CHANNEL

(75) Inventors: Wenjun Luo, Cupertino, CA (US); Magda El Zarki, Irvine, CA (US); Lei Zan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 336 days.

(21) Appl. No.: 11/042,909

(22) Filed: Jan. 24, 2005

(65) Prior Publication Data

US 2006/0018288 A1    Jan. 26, 2006

Related U.S. Application Data

(60) Provisional application No. 60/538,558, filed on Jan. 22, 2004.

(51) Int. Cl.
*H04Q 7/00* (2006.01)
(52) U.S. Cl. .............. 370/334; 455/562.1; 455/101; 455/272; 455/550.1; 455/553.1; 455/575.1; 455/137; 370/312; 370/208; 370/203; 370/487
(58) Field of Classification Search ........... 455/562.1, 455/522, 550, 553, 575.1, 262.1, 561, 454, 455/550.1; 375/347, 267; 370/208, 203, 370/312, 348, 487; 725/73
See application file for complete search history.

(56) References Cited

U.S. PATENT DOCUMENTS

| | | | | |
|---|---|---|---|---|
| 5,610,916 A | * | 3/1997 | Kostreski et al. | ............ 370/487 |
| 5,646,942 A | * | 7/1997 | Oliver et al. | ................. 370/312 |
| 5,784,683 A | * | 7/1998 | Sistanizadeh et al. | ......... 725/73 |
| 6,097,771 A | | 8/2000 | Foschini | |
| 6,240,274 B1 | | 5/2001 | Izadpanah | |
| 6,317,466 B1 | | 11/2001 | Foschini et al. | |

(Continued)

OTHER PUBLICATIONS

Chuah, C-N, et al., Capacity of Multi-Antenna Array Systems in indoor Wireless Environment, IEEE GlobeCom, Nov. 1998, pp. 1894-1899.

(Continued)

*Primary Examiner*—Rafael Pérez Gutiérrez
*Assistant Examiner*—Joseph Arévalo
(74) *Attorney, Agent, or Firm*—Orrick, Herrington & Sutcliffe LLP

(57) ABSTRACT

A wireless communication system configured for the efficient allocation of resources is provided. The wireless communication system can include a transmit system having a first set of one or more antennas each configured to transmit a data signal over a region to a receive system having a second set of two or more antennas each configured to receive the transmitted data signal. The transmit system can be configured to adjust a transmission parameter of a data signal based on a level of signal fading in the region to sustain a target bit rate, adjust a power and a bit rate at which a data signal is transmitted based on the level of signal fading in the region and select a subset of antennas within the first set of antennas to be used to transmit a data signal based on the level of signal fading in the region.

17 Claims, 10 Drawing Sheets

U.S. PATENT DOCUMENTS

| | | | |
|---|---|---|---|
| 6,509,836 B1 | 1/2003 | Ingram | |
| 6,622,023 B2 | 9/2003 | Chheda | |
| 2002/0193146 A1* | 12/2002 | Wallace et al. | 455/562 |
| 2003/0043928 A1* | 3/2003 | Ling et al. | 375/267 |
| 2003/0087673 A1* | 5/2003 | Walton et al. | 455/562 |
| 2003/0125040 A1* | 7/2003 | Walton et al. | 455/454 |
| 2003/0128658 A1* | 7/2003 | Walton et al. | 370/208 |
| 2003/0157954 A1* | 8/2003 | Medvedev et al. | 455/522 |
| 2004/0002364 A1* | 1/2004 | Trikkonen et al. | 455/562.1 |

OTHER PUBLICATIONS

Foschini, G.J., Layered Space-Time Architecture for Wireless Communication in a Fading Environment When Using Multi-Element Antennas, Bell Labs Technical Journal, Autumn 1996, pp. 41-59.

Goldsmith, A.J. et al., Variable-Rate Variable-Power MQAM for Fading Channels, IEEE Transactions on Communications, vol. 45, No. 10, Oct. 1997, pp. 1218-1230.

Hsu, C-Y et al., Joint Encoder and VBR Channel Optimization with Buffer and Leaky Bucket Constraints, Proceedings of International Symposium on Multimedia Communications and Video Coding, Brooklyn, NY, Oct. 1995, pp. 1-9.

Hui, A.L.C. et al., Successive Interference Cancellation for Multiuser Asynchronous DS/CDMA Detectors in Multipath Fading Links, IEEE Transactions on Communications, vol. 46, No. 3, Mar. 1998, pp. 384-391.

Liu, H. et al., Delay and Synchronization Control Middleware to Support Real-Time Multimedia Services over Wireless PCS Networks, IEEE Journal on Selected Areas in Communications, vol. 17, No. 9, Sep. 1999, pp. 1660-1672.

Liu, H. et al., Performance of H.263 Video Transmission over Wireless Channels Using Hybrid ARQ, IEEE Journal on Selected Areas in Communications, vol. 15, No. 9, Dec. 1997, pp. 1775-1786.

Luo, W. et al., Quality Control for VBR Video over ATM Networks, IEEE Journal on Selected Areas in Communications, vol. 15, No. 6, Aug. 1997, pp. 1029-1039.

Raleigh, G.G. et al., Spatio-Temporal Coding for Wireless Communications, IEEE Globecom, Nov. 1996, pp. 1809-1814.

Raleigh, G.G. et al., Spatio-Temporal Coding for Wireless Communications, IEEE Transactions on Communications, Vol. 46, No. 3, Mar. 1998, pp. 357-366.

Winters, J.H. et al., The Impact of Antenna Diversity on the Capacity of Wireles Communications Systems, IEEE Transactions on Communications, vol. 42, No. 2/3/4, Feb./Mar./Apr. 1994, pp. 1740-1751.

Winters, J.H., et al., The Impact of Antenna Diversity on the Capacity of Wireless Communication System, IEEE Transactions on Communications, vol. 42, No. 2/3/4, Feb./Mar./Apr. 1994, pp. 1740-1751.

Wolniansky, P.W. et al., V-Blast: An Architecture for Realizing Very High Data Rates Over the Rich-Scattering Wireless Channel, Bell Laboratories, Lucent Technologies, Holmdel, NJ.

Yoon, Y.C. et al., A Spread-Spectrum Multiaccess System with Cochannel Interface Cancellation for Multipath Fading Channels, IEEE Journal on Selected Areas in Communications, vol. 11, No. 7, Sep. 1993, pp. 1067-1075.

PacketVideo Multimedia Technology Overview, PacketVideo Technology, www.packetvideo.com, Feb. 28, 2001.

* cited by examiner

```
Matlab code for method 300

Pmax=1000000000;
for subset=1:M %pick only subset pair of antennas
    TxSubChoice = nchoosek(1:M, subset);
    TxNumOfChoice = size(TxSubChoice,1);
    RvSubChoice = nchoosek(1:M, subset);
    RvNumOfChoice = size(RvSubChoice,1);

for TxChoice=1:TxNumOfChoice
      for RvChoice=1:RvNumOfChoice
          %build the sub matrix based on
          %first take out rows based on RvSelection
          for index = 1:subset
              Ctmp1(index,:)=Channel(RvSubChoice(RvChoice,index),:);
          end
          %second, take out columns based on TxSelection
          Ctmp=zeros(subset);
          for index = 1:subset
              Ctmp(:,index)=Ctmp1(:,TxSubChoice(TxChoice,index));
          end K=zeros(subset,1);
          Pwr=zeros(subset,1);

if debug>0
              fprintf(fid,'-Tx and Rv Candidate is ');
              fprintf(fid,'%d\t', TxSubChoice(TxChoice,:));
              fprintf(fid,'\n');
              fprintf(fid,'%d\t', RvSubChoice(RvChoice,:));
              fprintf(fid,'\n');
          end H=pinv(ctranspose(Ctmp)*Ctmp);

%first estmate Lamda's initial value
          tmp=BitsTarget;
          for i=1:subset
              tmp=tmp+log2(const*log(2)*real(H(i,i)));
          end
          Lamda=power(2,tmp/subset); %M*log2(lamda)-sum(-)=BitsTarget Total=CalcTotal(Lamda, subset, const, H);
          if Total-BitsTarget > 0.5
              LamdaMin = 0;
              LamdaMax = Lamda;
          else
              LamdaMin = Lamda;
              LamdaMax = 2*Lamda;
          end
```

400

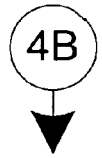

FIG. 4A

```
        while abs(Total-BitsTarget)>=0.5
           Lamda=(LamdaMin+LamdaMax)/2;
           Total=CalcTotal(Lamda, subset, const, H);
           if Total<BitsTarget
              LamdaMin = Lamda;
           else                                              ← 400
              LamdaMax = Lamda;
           end
        end for i=1:subset  .%now alloc bits and pwr
           K(i)=round( max(log2(Lamda)-log2( const*log(2)*real(H(i,i)) ),0) );
           %number of bits sent in this symbol period, due to rounding error, sum of K may be M larger than target if K(i)>Kmax
              K(i)=Kmax;
           end Pwr(i)= const*(power(2,K(i))-1)*real(H(i,i));
           if debug>0
              fprintf(fid,'K(%d)=%d,\t', i, K(i));
              fprintf(fid,'Pwr(%d)=const[%d]*2^K[%d]*Hii[%d]=%d\n', i, const, K(i), real(H(i,i)), Pwr(i));
           end
        end %for i=1:subset for alloc K and Pwr if sum(Pwr)<Pmax
           Pmax=sum(Pwr);
           TxSelection=TxSubChoice(TxChoice,:);
           RvSelection=RvSubChoice(RvChoice,:);
           Psub=Pwr;
           Ksub=K;
           Csub=Ctmp;
        end end % for RvSelection
   end % for TxSelection %now, Selection contains the subset of antennas with minimum Pmax end % for subset index %reset K and Pwr dimension
K=zeros(M,1);
Pwr=zeros(M,1);
for i = 1:size(TxSelection,2)
   Pwr(TxSelection(i)) = Psub(i);
   K(TxSelection(i)) = Ksub(i);
end if debug>0
   fprintf(fid,'TxAnt selection is ');
   fprintf(fid,'%d\t', TxSelection);
   fprintf(fid,'RvAnt selection is ');
   fprintf(fid,'%d\t', RvSelection);
   fprintf(fid,'\n');
end
```

FIG. 4B

SYSTEMS AND METHODS FOR RESOURCE ALLOCATION TO MULTIPLE ANTENNA ARRAYS FOR MAINTAINING A CONSTANT BIT RATE (CBR) CHANNEL

CROSS-REFERENCE TO RELATED APPLICATIONS

This application claims the benefit of U.S. Provisional Application No. 60/538,558, filed Jan. 22, 2004, which is fully incorporated herein by reference.

This invention was made with Government support under Grant No. ANI-0205720 awarded by the National Science Foundation The Government has certain rights in this invention.

FIELD OF THE INVENTION

The present invention relates generally to wireless communications, and more particularly to the allocation of resources in adaptive antenna arrays for maintaining a constant bit rate (CBR) channel.

BACKGROUND OF THE INVENTION

The issue of how to effectively transport large amounts of data across fluctuating radio channels is a challenging hurdle. For instance, high quality multimedia (MM) streams that use highly compressed data, such as the video compression standard MPEG-4, are very susceptible to low quality fluctuating channel conditions. There are two fundamentally different approaches to deal with fluctuating radio channels, one at the video processing layer, and the other at the physical layer. Due to the extremely high variation in channel quality, inversion of the fading effects of the fluctuating channel with adaptive power control is not desirable, as the power level could have to be varied dramatically with the maximum power level at least several tens of times higher than the average power level. Due to this challenge at the physical layer, much effort has been focused on the design of a video processing layer that treats the fluctuating channel fading condition and the resultant errors as a given and subsequently focuses on how to adapt to and recover from it.

However, advancements in adaptive antenna array (AAA) technologies such as BLAST (Bell Laboratories Layered Space Time), which uses multiple spatial sub-channels within a single frequency channel, has made it possible to address channel fluctuations at the physical layer since dramatic changes in transmitting power are no longer necessary to inverse channel fading. This is because multiple antennas and spatial sub-channels provide diversity, which can "smooth out" the aggregate channel fluctuation across different transmission periods. This is conceptually similar to statistical multiplexing. Certain simulation results have shown that a 2×2 antenna matrix system can witness a 45% drop in the standard deviation of the average fading level among all sub-channels in each transmission period as compared with the single antenna case, and an 8×8 system can witness a 75% drop in the deviation. AAA systems are described in more detail in U.S. Pat. No. 6,097,771 issued to Foschini and U.S. Pat. No. 6,317,466 issued to Foschini et al., both of which are fully incorporated herein by reference.

The use of multiple antennas does introduce another dimension of variation referred to as diversity, or the variation in fading levels among the various spatial sub-channels. The equal allocation of resources, including both power and bit rate, to each transmitting antenna as implemented in most AAA systems, is inefficient. In fact, simulation results show that a significant amount of power is wasted to maintain a low target bit error rate ($BER_{target}$) and probability of outage (P(outage)).

There are generally two reasons for the inefficiency. First, each sub-channel can experience vastly different fading conditions, so in order to compensate for the worst fading scenario to maintain a low $BER_{target}$ and P(outage), extra power needs to be allocated to ensure that the signal-to-noise ratio (SNR) of each received symbol in every sub-channels is high enough for accurate detection. Safe-guarding the power level for the worst scenario results in significant waste in the other sub-channels having less severe fading levels.

Second, the above is also applicable to sub-channel bit rate allocation. In most typical resource allocation schemes, each sub-channel transmits at the same bit rate. When a specific sub-channel suffers from severe fading and, hence, a potentially high BER, the resources allocated to that sub-channel are essentially wasted unless transmitting power is increased. But such a power increase, on the other hand, is wasted on the sub-channels having a sufficient SNR.

Accordingly, improved communication systems are needed that can efficiently allocate resources to multiple antennas within a wireless communication environment.

SUMMARY

In one embodiment, which is described below as an example only and not to limit the invention, a wireless communication system is provided having a transmit system and a receive system. The transmit system includes a first set of one or more antennas and is configured to transmit a data signal from two or more of the antennas in the first set over a region and the receive system includes a second set of two or more antennas each configured to receive the two or more transmitted data signals. The transmit system is also configured to adjust a transmission parameter of at least one data signal based on the level of signal fading in the region to sustain a target bit rate of communication.

In another embodiment, which is described below as an example only and not to limit the invention, a wireless communication system is provided having a transmit system and a receive system. The transmit system includes a first set of one or more antennas and is configured to transmit a data signal from one or more of the antennas in the first set over a region and the receive system includes a second set of two or more antennas each configured to receive the one or more transmitted data signals. The transmit system is also configured to adjust a power at which at least one data signal is transmitted and a bit rate at which at least one data signal is transmitted based on a level of signal fading in the region.

In yet another embodiment, which is described below as an example only and not to limit the invention, a wireless communication system is provided having a transmit system and a receive system. The transmit system includes a first set of one or more antennas each configured to transmit a data signal over a region and the receive system includes a second set of two or more antennas each configured to receive data transmitted by the first set of antennas. The transmit system is also configured to select a subset of antennas from the first set based on the level of signal fading in the region and transmit at least one data signal from each antenna in the subset.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to the details of the example embodiments.

BRIEF DESCRIPTION OF THE FIGURES

The details of the invention, both as to its structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIGS. 4A-B are listings of a computer code for carrying out another exemplary method of selecting a subset of antennas.

DETAILED DESCRIPTION

The systems and methods described herein allow for the efficient allocation of resources within a wireless communication system using multiple antenna arrays. More specifically, the systems and methods described herein allow the adjustment of the number of transmitting antennas and the various transmission parameters of those antennas based on the level of signal fading that occurs in the transmitted signals.

Figure 1:
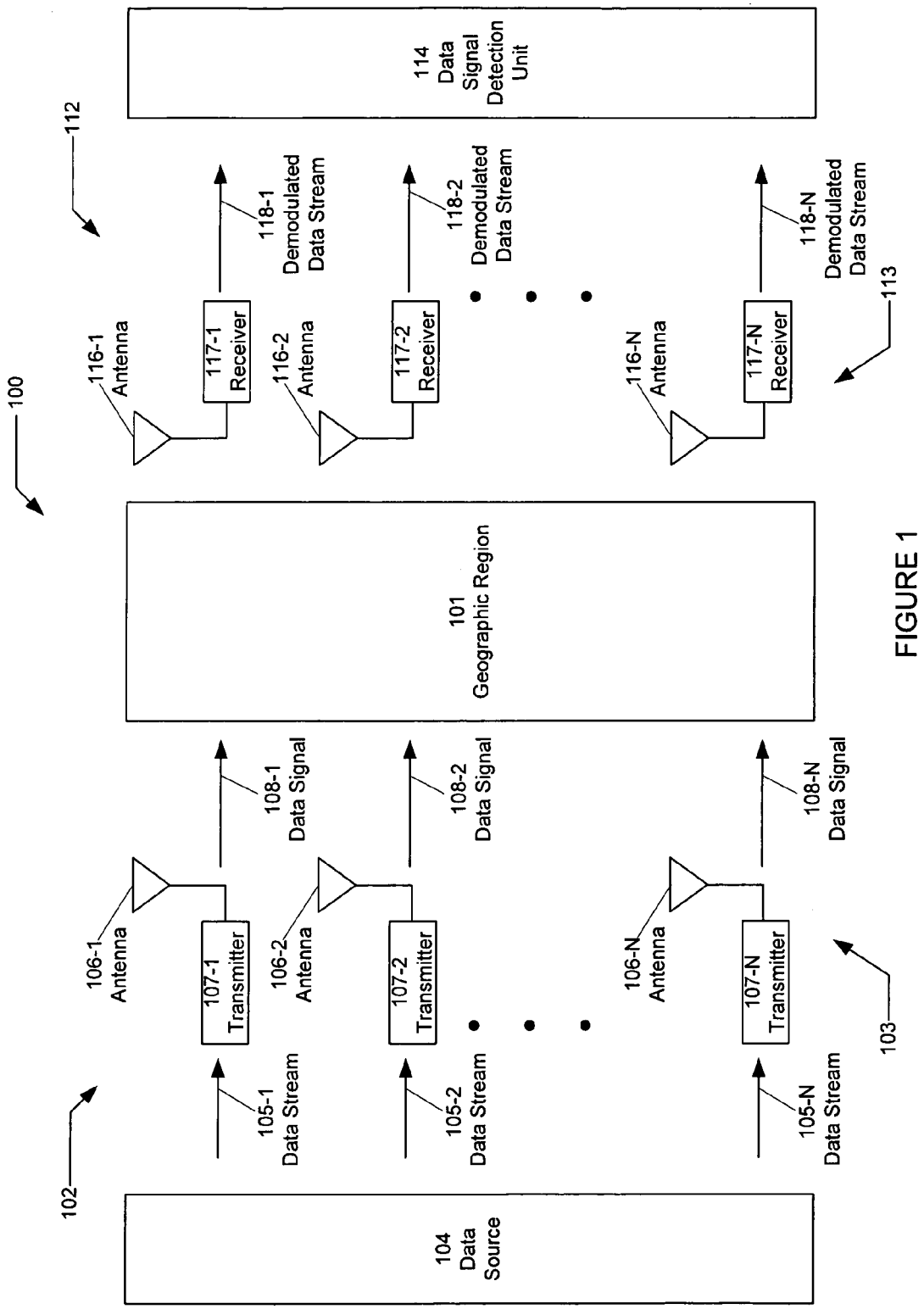
FIG. 1 is a block diagram depicting one exemplary embodiment of a wireless communication system.

FIG. 1 is a block diagram depicting one exemplary embodiment of a wireless communication system 100 for use with the systems and methods described herein. In this embodiment, wireless system 100 includes a transmit system 102 and a receive system 112. The transmit system 102 includes a data source unit 104 communicatively coupled with a set 103 of M antennas 106, where M can be any number greater than or equal to two. Each antenna 106 is communicatively coupled with a transmitter 107. The data source unit 104 is configured to output a data stream 105 to each transmitter 107, which is configured to modulate and/or process the data stream 105 and transmit the modulated data stream 105 as a data signal 108 over a geographic region 101 to the receive system 112. The receive system 112 includes a data signal detection unit 114 and a set 113 of N antennas 116, where N can be any number greater than or equal to 2, preferably greater than or equal to M. Each antenna 116 is communicatively coupled with a receiver 117 and configured to receive one or more data signals 108 transmitted from the transmit system 102, demodulate and/or process the received data signals 108 and output the received data signals 108 to the detection unit 114 as demodulated data streams 118. The detection unit 114 is configured to process the received data streams 118 to obtain the desired data in the originally transmitted data streams 105.

The data streams 105, antennas 106, transmitters 107 and data signals 108 are referenced in FIG. 1 using the notation 105-X, 106-X, 107-X and 108-X, where -X is used to indicate a specific data stream 105, antenna 106, transmitter 107 or data signal 108, respectively. For the transmit system 102, X can be any number between 1 and M. Similarly, for the receive system 112, the antennas 116, receivers 117 and data streams 118 are referenced using the notation 116-Y, 117-Y and 118-Y, where -Y is used to indicate a specific antenna 116, receiver 117 or data stream 118, respectively, and can be any number between 1 and N. Preferably, the number of antennas 116 in the receive system 112 is greater than or equal to the number of antennas 106 in the transmit system 102, i.e., $N \geq M$.

Wireless communication system 100 is preferably implemented in environments directed towards maintaining a target bit rate of communication and minimizing the instances where the communication rate falls below the target rate. Example of these types of environments include, but are not limited to sustainable bit rate (SBR) applications such as voice over internet protocol (VoIP), constant bit rate (CBR) video, variable bit rate (VBR) video and the like. It should be noted that wireless communication system 100 can also be implemented in other wireless communication environments that are not directed to maintaining a target bit rate of communication such as WiFi, WiMax, various 3G and 4G environments and the like.

For ease of discussion, wireless communication system 100 will be described herein as operating within an SBR application using a quadrature amplitude modulation (QAM) technique. However, one of skill in the art will readily recognize that wireless communication system 100 can be used in other applications and with other modulation techniques and, accordingly, wireless communication system 100 is not limited to QAM within an SBR application.

Wireless communication system 100 operates to communicate data by utilizing the variable multipath fading conditions which occur in region 101, which is the spatial region over which the transmitted signals propagate. The multipath fading conditions are effected by both geographical and time-varying factors. The multipath fading conditions operate to provide system 100 with multiple spatial sub-channels within each frequency channel in which system 100 operates. A frequency channel having multiple spatial sub-channels is referred to herein as a conduit. Each sub-channel can carry data signals 108-1 through 108-M corresponding to sub-streams of data from one user, multiple streams of data from multiple users and any other arrangement desired. The number of sub-channels corresponds to the minimum of M and N.

Data streams 105-1 through 105-M can be coded to combat error or provide additional diversity. In this embodiment, data signals 108-1 through 108-M have been modulated into symbols and transmitted by transmitters 107-1 through 107-M from antennas 106-1 through 106-M using a QAM technique. The antennas 116-1 through 116-N and receivers 117-1 through 117-N can be configured to receive any or all of the transmitted data signals 108-1 through 108-M. Each receiver 117-1 through 117-N outputs the received data stream 118-1 through 118-N, respectively, to detection unit 114 for processing. Detection unit 114 can utilize various linear and non-linear algorithms to process these streams 118-1 through 118-N into the originally transmitted symbols. Examples include, but are not limited to minimum MSE, zero forcing, maximum likelihood and optimum cancellation.

System 100 is preferably configured to monitor the level of fading that each data signal 108-1 through 108-M experiences when transmitted through region 101 and use this information, in part, to model region 101. Preferably, region 101 is modeled using a transfer matrix C where the elements of the transfer matrix C are represented by complex value zero mean Gaussian variables. The transfer matrix C can be estimated periodically with the use of a train sequence, preferably transmitted at the beginning of each high rate period, or burst period.

System 100 preferably uses a reverse communication channel 130 to monitor the signal fading conditions and relay the monitored information to transmit system 102. Reverse communication channel 130 can be implemented in any manner desired. In Time Division Duplexing (TDD) systems, channel 130 can be provided through reciprocity, for instance, training signals can be transmitted by receive system 112 and monitored by transmit system 102, which can then estimate the signal fading levels therefrom. In Frequency Division Duplexing (FDD) systems, receive system 112 notifies the transmit system 102 of the signal fading conditions periodically. The notification can be done using a normal but relatively lower error transmission (e.g., a transmission with greater error protection coding and the like).

Based on the level of fading in each sub-channel, transmit system 102 is preferably configured to adjust the system resource allocation accordingly to communicate data signals 108-1 through 108-M more efficiently. Adjusting the allocation of resources can allow system 100 to achieve very low $BER_{target}$ and P(outage) levels while maintaining a target CBR. The transmit system 102 can be configured to adjust the resource allocation in any number of ways. Preferably, the transmit system 102 is configured to adjust the resource allocation by selecting a subset of the antennas 106-1 through 106-M from which to transmit, adjusting the transmission parameters of each data signal 108-1 through 108-N being transmitted or both. The transmission parameters can include, but are not limited to the power and the bit rate at which the data signal-108-1 through 108-M is transmitted.

For instance, transmit system 102 can select a subset of antennas 106 corresponding to those data signals 108-1 through 108-M that experience relatively smaller levels of fading, thereby saving power which otherwise would be wasted on the data signals 108-1 through 108-M that experience relatively higher levels of fading. Also, for the data signals 108-1 through 108-M that experience relatively higher levels of fading, the transmit system 102 can increase the power allocated to transmit each of those data signals 108-1 through 108-M in order to compensate for the higher fading. Or, for those data signals 108-1 through 108-M that experience relatively lower levels of fading, the transmit system 102 can increase the bit rate at which those data signals 108-1 through 108-M are transmitted, decrease the power at which those data signals 108-1 through 108-M are transmitted or any combination thereof.

Alternatively, the transmit system 102 can decrease the power allocated to transmit data signals 108-1 through 108-M that experience relatively higher levels of fading and increase the power allocated to transmit data signals 108-1 through 108-M that experience relatively lower levels of fading in order to concentrate resources on the better sub-channels. The decision whether to transmit from a given antenna 106-1 through 106-M, or whether to increase or decrease the power and/or bit rate at which a data signal 108-1 through 108-M is transmitted, can be based on any level of fading as desired. The above examples are intended to illustrate several ways in which the transmit system 102 can allocate resources based on signal fading; however, it should be understood these examples are not exhaustive and, accordingly, the systems and methods described herein should not be limited to only these examples.

In one embodiment, the receive system 112 can be implemented as a zero-forcing linear detector to detect the transmitted data streams 105-1 through 105-M from the received data streams 118-1 through 118-N. This detection process can be conceptually described as:

$$\vec{S}_{detected} = C^{-1} \cdot \vec{r} = C^{-1} \cdot (C \cdot \vec{S}_{sent} + \vec{n}) = \vec{S}_{sent} + C^{-1} \cdot \vec{n} \quad (1)$$

where $\vec{S}_{detected}$ is a vector representing the symbols detected by the detection unit 112, C represents the transfer matrix of region 101, $\vec{S}_{sent}$ is a vector representing the actual symbols sent by the antennas 106-1 through 106-M, $\vec{n}$ is a vector representing the random noise at each receiving antenna 116-1 through 116-N and $\vec{r}$ is a vector representing the received signal, which is equal to $C \cdot \vec{S}_{sent} + \vec{n}$. Each element in the vector $\vec{S}_{detected}$ is then compared with all constellation points and the point with the minimum distance from the respective element is determined as the original QAM symbol. In this embodiment, the level of fading in each sub-channel can be conceptually reflected in the noise component. In other words, when a spatial sub-channel experiences a relatively high level of fading, it is as if the noise components from all other sub-channels are magnified and superimposed on this sub-channel, resulting in high symbol detection error.

Preferably, the transmit system 102 uses an algorithmic approach to adjust the transmission parameters for each data signal 108-1 through 108-M. The following description illustrates the derivation of one exemplary algorithm, which can be used to determine an optimal bit rate for each data signal 108-1 through 108-N and an optimal power allocation to each antenna 106-1 through 106-M, i.e., an optimal power at which each data signal 108-1 through 108-M is transmitted.

For this algorithm, let $Es_i$ denote the power allocation to transmit a data signal from antenna i, $K_i$ denote the number of bits represented by a QAM symbol sent from the $i^{th}$ antenna, C denote the transfer matrix of region 101 and let $L_i = 2^{Ki}$ represent the corresponding QAM constellation size. For each sub-channel, the BER is tightly bounded by $$BER_i \leq 0.2 \cdot \exp\left\{-\frac{1.5}{L_i - 1} \frac{Es_i}{N_0} \frac{1}{[C^+C]_{ii}^{-1}}\right\} = BER_{target} \quad (2)$$

The objective is to adjust $L_i$ and $Es_i$ for each antenna to maintain the fixed BER upper bound $BER_{target}$. Based on (2), $Es_i$ can be expressed as:

$$Es_i = \frac{-\ln(5BER_{target}) \cdot N_0}{1.5} \cdot (L_i - 1) \cdot [C^+C]_{ii}^{-1} \quad (3)$$
$$= const \cdot (L_i - 1) \cdot [C^+C]_{ii}^{-1}$$

where const=$-\ln(5BER_{target}) \cdot N_0/1.5$, and where $N_0$ is representative of the level of noise. A minimum total power consumption for all antennas 106-1 through 106-M can then be expressed as:

$$Es = \sum_{i=1}^{M} Es_i \quad (4)$$
$$= const \cdot \sum (L_i - 1) \cdot [C^+C]_{ii}^{-1}$$
$$= const \cdot \sum (2^{K_i} - 1) \cdot [C^+C]_{ii}^{-1}$$

subject to the constraints that $$\sum_{i=1}^{M} K_i = CBR \text{ target bit rate}$$

target bit rate for a symbol period. This is a standard optimization problem where Lagrange multipliers and the Kuhn Tucker Theorem can be applied to prove that the solution:

$$K_i = [\log_2(-\lambda) - \log_2(const \cdot ln2 \cdot [C^+C]_{ii}^{-1})]^+ \quad (5)$$

is the assignment that minimizes the total power consumption, where $\lambda$ is calculated by $$\Sigma[\log_2(-\lambda) - \log_2(const \cdot ln2 \cdot [C^+C]_{ii}^{-1})]^+ = CBR \text{ target bit rate} \times T_{symbol \, period} \quad (6)$$

where $T_{symbol \, period}$ is the length of the symbol period. Here $[x]^+$ denotes the positive part of x, i.e.

$$[x]^+ = \begin{cases} x, & \text{if } x \geq 0 \\ 0, & \text{if } x < 0 \end{cases} \quad (7)$$

Replacing (5) into (3), we obtain $$Es_i = const \cdot \left( \frac{-\lambda}{const \cdot ln2 \cdot [C^+C]_{ii}^{-1}} - 1 \right) \cdot [C^+C]_{ii}^{-1} \quad (8)$$
$$= \frac{-\lambda}{ln2} - const \cdot [C^+C]_{ii}^{-1}$$

Preferably, the transmit system 102 determines how to allocate power and bit rate within the system 100 based on eq. (8). However, the systems and methods described herein are not limited to only this algorithmic approach defined by eq. (8), and can be extended to any method or algorithm that adjusts transmission parameters based on the level of signal fading.

According to (5), a smaller value of $[C^+C]_{ii}^{-1}$ indicates less signal fading and generally leads to a larger value for $K_i$, which according to eq. (8) in turn leads to a larger power allocation to that antenna 106-1 through 106-M. So instead of allocating more resources to data signals 108-1 through 108-M corresponding to sub-channels suffering from relatively higher levels of fading, resources are preferably concentrated on "good" sub-channels that experience relatively lower levels of fading.

In another embodiment, implementation complexity is reduced by concentrating on the allocation of power instead of the adjustment of bit rate through the dynamic change in QAM constellations. Here, the following algorithm from eq. (3) is an exemplary algorithm that can be used to adjust power allocation:

$$Es_i = \frac{-\ln(5BER_{target}) \cdot N_0}{1.5} \cdot (L - 1) \cdot [C^+C]_{ii}^{-1} \quad (9)$$
$$= const \cdot (L - 1) \cdot [C^+C]_{ii}^{-1}$$

Where L=CBR target bit rate/M, i.e., each antenna 106-1 through 106-M sends an equal number of bits per symbol.

Figure 2:
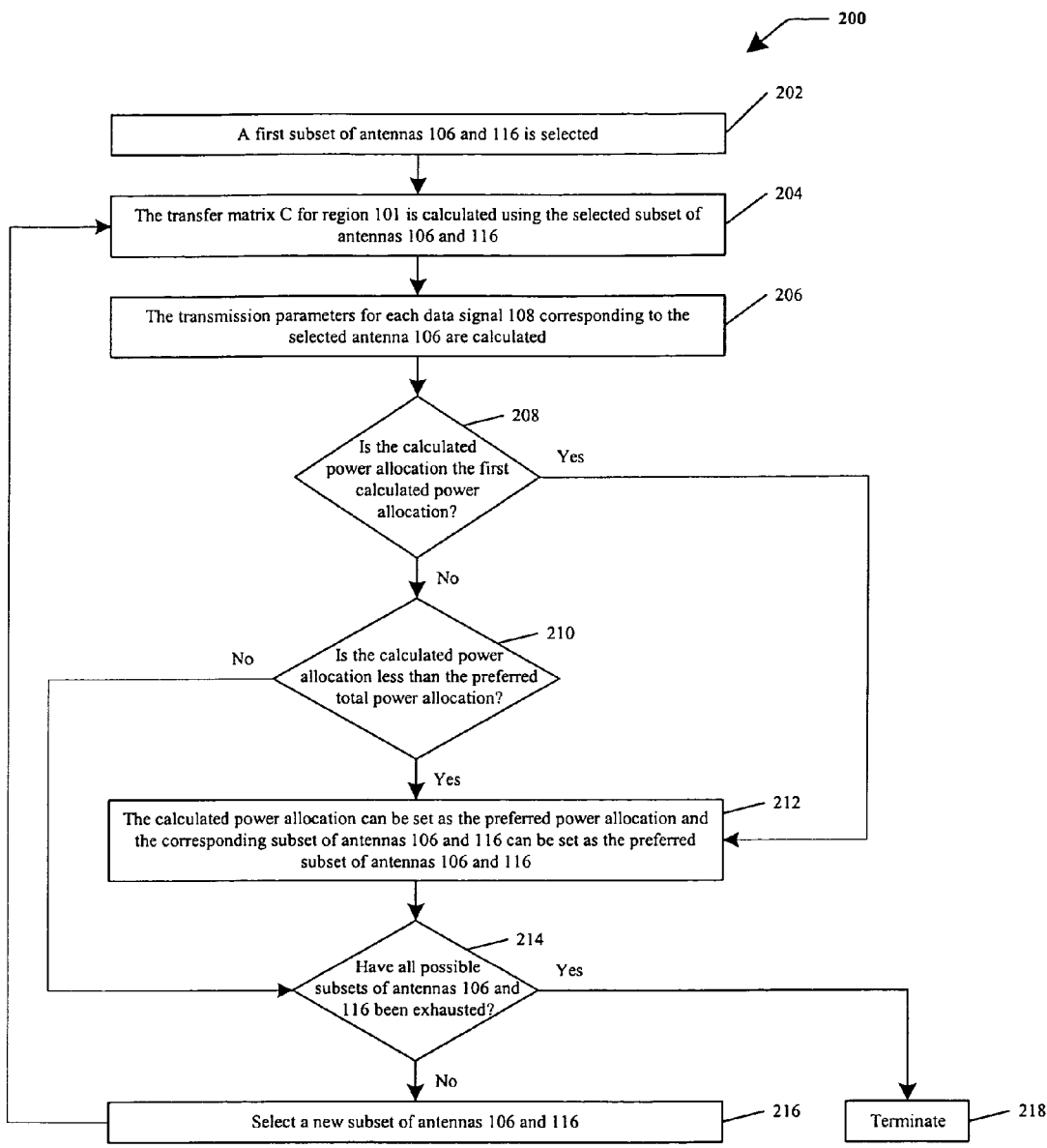
FIG. 2 is a flow diagram depicting one exemplary method of selecting a subset of antennas.

FIG. 2 is a flow diagram depicting one exemplary method 200 of allocating resources by selecting an optimal subset of antennas 106 for use in transmission. At 202, a first subset of antennas 106 and 116 is selected. Then, at 204, the transfer matrix C for region 101 is calculated using the selected subset of antennas 106 and 116. Next, at 206, the transmission parameters for each data signal 108 corresponding to the selected antenna 106 are calculated. Preferably, the transmission parameters include the power allocation to each antenna 106 and the bit rate or symbols-per-bit for each data signal 108 transmitted from the respective antenna 106. At 208, it is determined whether the calculated power allocation is the first calculated power allocation. If so, then at 212 the calculated power allocation can be set as the preferred power allocation and the corresponding subset of antennas 106 and 116 can be set as the preferred subset of antennas 106 and 116. If not, the method proceeds to 210. As an alternative to using the first calculated power and corresponding antennas 106 and 116 as the preferred power and antennas 106 and 116, any other subset can be used as the default preferred subset including the full M×N set of antennas 106-1 through 106-M and 116-1 through 116-N.

At 210, the calculated power allocation is compared to the preferred total power allocation. If the calculated power allocation is less than the preferred total power allocation, then at 212, the calculated power allocation is set as the new preferred power allocation and the subset of antennas 106 and 116 is set as the new preferred subset of antennas 106 and 116. If the calculated power allocation is greater than the preferred power allocation, the method 300 proceeds to 214. At 214, it is determined whether all possible subsets of antennas 106 and 116 have been exhausted and, if so, the method terminates at 218 and selects the preferred subset of antennas 106 and 116 for use in communication. If all of the subsets have not been exhausted, a new subset is selected at 216 and the method returns to 204.

Figure 3:
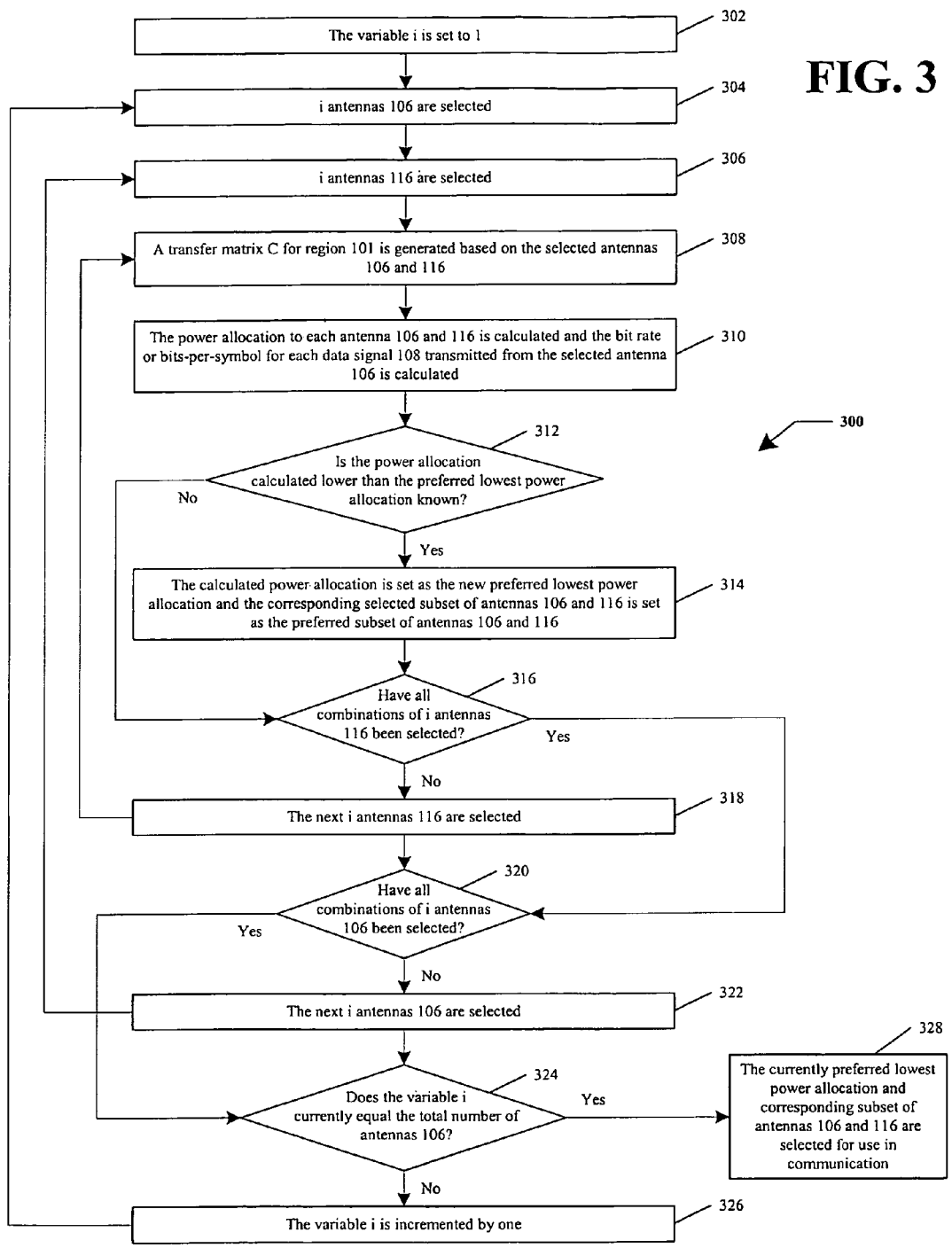
FIG. 3 is a flow diagram depicting another exemplary method of selecting a subset of antennas.

FIG. 3 depicts another exemplary method 300 of allocating resources by selecting an optimal subset of antennas 106 for use in transmission. In this embodiment, the number of antennas 106-1 through 106-M used for transmission equals the number of antennas 116-1 through 116-M used for reception. At 302, the variable i is set to 1 and it is assumed that only i antennas 106 and 116 are used. At 304, the first i antennas 106 are selected. At 306, the first i antennas 116 are selected. At 308, a transfer matrix C for region 101 is generated based on the selected antennas 106 and 116. At 310, the power allocation to each antenna 106 and 116 is calculated and the bit rate or bits-per-symbol for each data signal 108 transmitted from the selected antenna 106 is calculated. At 312, the power allocation calculated in 310 is compared to the preferred lowest power allocation known, if any. If the calculated power allocation is lower, or if there is no other power allocation known, then the calculated power allocation is set as the new preferred lowest power allocation and the corresponding selected subset of antennas 106 and 116 is set as the preferred subset of antennas 106 and 116 at 314. If the calculated power allocation is higher than the preferred lowest power allocation, then the method 300 proceeds to step 316.

At 316, it is determined whether all combinations of i antennas 116 have been selected and, if so, the method 300 proceeds to 320. If not, the method 300 proceeds to 318, where the next i antennas 116 are selected. From 318 the method 300 proceeds back to 308. At 320, it is determined whether all combinations of i antennas 106 have been selected and, if so, the method 300 proceeds to 324. If not, the method 300 proceeds to 322, where the next i antennas 106 are selected. From 322 the method 300 proceeds back to 306. At 324, it is determined whether the variable i currently equals the total number of antennas 106. If so, the method 300 proceeds to 328. If not, the variable i is incremented by one (i.e., i=i+1) at 326 and the method 300 proceeds back to 304. Finally, once all combinations are exhausted at 328, the currently preferred lowest power allocation and corresponding subset of antennas 106 and 116 are selected for use in communication. FIGS. 4A-B are listings of matlab computer code for carrying out another exemplary embodiment of method 300.

Wireless communication system 100 can also be configured to budget power during communication sessions. In one exemplary embodiment, power is budgeted in accordance with two guidelines. The first guideline is that, for each arbitrary time period over which the data signals 108-1 through 108-M are transmitted, power is budgeted such that the total power consumed by antennas 106-1 through 106-M in one period is less than a predetermined maximum power ($Pwr_{max}$). This guideline acts to minimize large power increases in certain time periods, for such purposes as to remain within radiation safety bounds, reduce interference and the like.

The second guideline is that the transmit system 102 is preferably configured to limit the number of consecutive periods where the total power consumed by the antennas 106-1 through 106-M used in transmission is greater than an average power consumption ($Pwr_{ave}$) by the antennas 106-1 through 106-M, where $Pwr_{ave}$ is the average power consumed over an entire communication session, defined as desired by the user. This guideline is applicable for applications using limited power supplies, such as batteries and the like, and acts to minimize the risk that the power supply will be drained too quickly.

Figure 5:
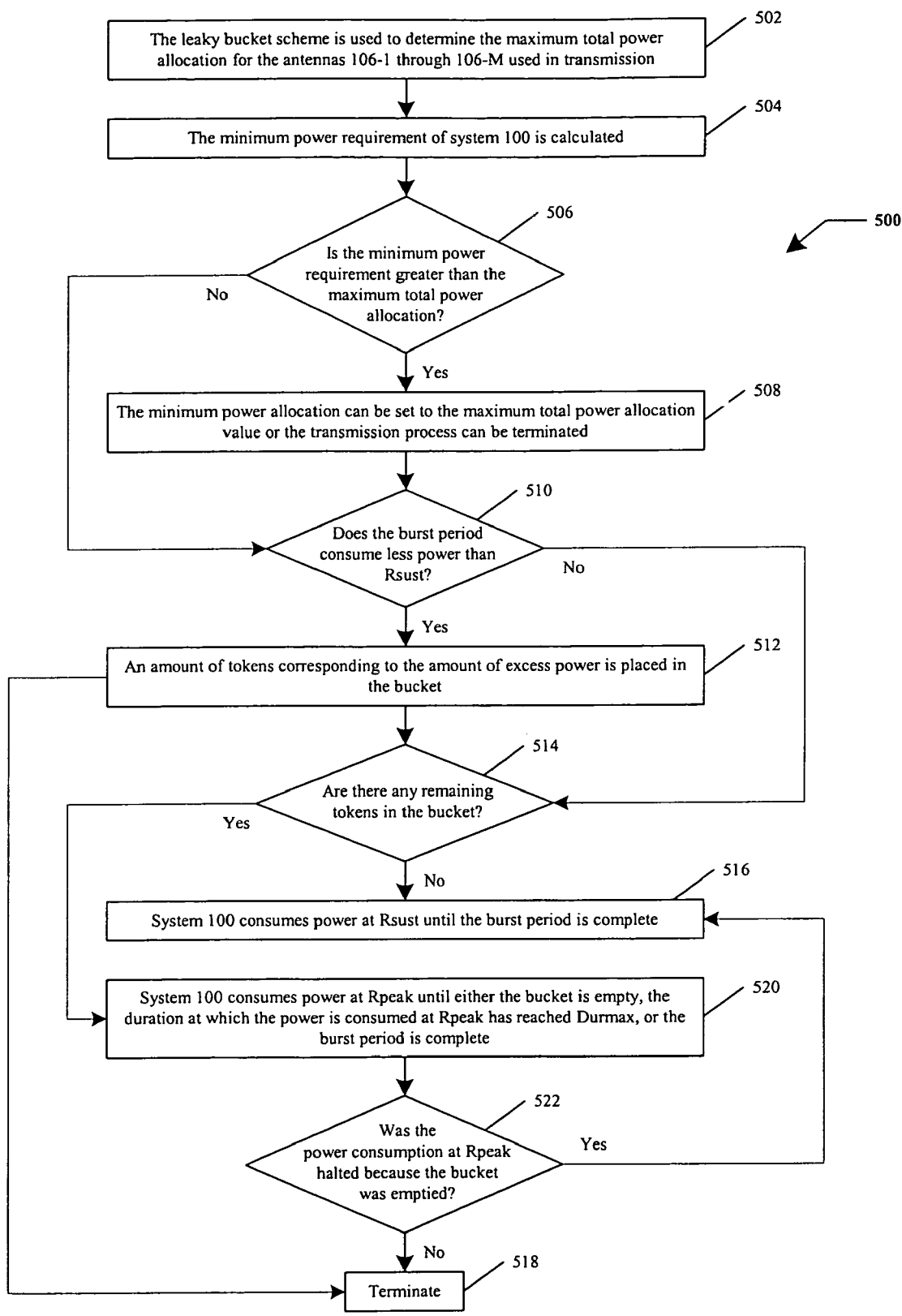
FIG. 5 is a flow diagram depicting an exemplary method of budgeting power.

FIG. 5 depicts an exemplary method 500 of budgeting power within wireless communication system 100 according to the two guidelines described above. Method 500 is similar to a method referred to as the "leaky bucket" scheme, which has been used within the wireless networking community to smooth out wireless traffic prone to frequent burst periods. The leaky bucket scheme is described in greater detail in C. Hsu and A. Ortega, "*Joint Encoder and VBR Channel Optimization with Buffer and Leaky Bucket Constraints*," Proceedings of International Symposium on Multimedia Communications and Video Coding, New York, N.Y., pp. 104-105, October 1995, which is hereby fully incorporated by reference.

In this example, method 500 preferably budgets power through reference to tokens, which represent a quantity of power determined by the user. The method 500 relies generally on the following three parameters: bucket size (B), sustained rate ($R_{sust}$) and peak rate ($R_{peak}$). The bucket is a conceptual device representing an amount of accumulated tokens, i.e., excess power, that the communication system 100 can use. For instance, if the communication system 100 consumes a relatively low amount of power during a burst period, the excess power can be stored as one or more tokens in the bucket which can be drained for use in subsequent periods.

Conversely, if the communication system 100 consumes a relatively high amount of power during a burst period, an amount of tokens corresponding to the excess power needed can be drained from the bucket. $R_{sust}$ is defined as the rate at which tokens fill the bucket. B is the bucket size, or maximum number of tokens that can be placed in the bucket at any one time. Tokens can be drained from the bucket at any rate less than or equal to $R_{peak}$ until the bucket is empty, at which point tokens can be drained at the rate of $R_{sust}$. $R_{peak}$ is preferably set at a rate substantially equal to $Pwr_{max}$. The maximum duration ($Dur_{max}$) where the power consumption is at $Pwr_{max}$ is preferably expressed as $(R_{sust}+B)/R_{peak}$.

Referring to FIG. 5, at 502, at the start of a burst period, the leaky bucket scheme is used to determine the maximum total power allocation for the antennas 106-1 through 106-M used in transmission. In one exemplary embodiment, the burst period is arbitrarily defined as the transmission of 100 symbols, although it should be noted that the burst period can be set at any duration desired by the user. At 504, the minimum power requirement of system 100 is calculated, for instance, by using eq. (8) or (9). At 506, the minimum power requirement is compared to the maximum total power allocation. If the minimum power requirement is greater than the maximum total power allocation, then the method 500 proceeds to 508 where the minimum power allocation can be set to the maximum total power allocation value or the transmission process can be terminated etc., since the BER will likely be too large and lead to an outage.

If the minimum power requirement is less than the maximum total power allocation, then the method 500 proceeds to 510. At 510, it is determined whether the burst period consumes less power than $R_{sust}$. If so, the method 500 proceeds to 512 and an amount of tokens corresponding to the amount of excess power is placed in the bucket and the method 500 terminates at 518. If the burst period does not consume less power than $R_{sust}$, then at 514, the method 500 determines if there are any remaining tokens in the bucket. If there are no tokens, then the method 500 proceeds to 516 and consumes power at $R_{sust}$ until the burst period is complete, at which point the method 500 terminates at 518. If, after 512, there are tokens in the bucket, then the method 500 proceeds to 520 and consumes power at $R_{peak}$ until either the bucket is empty, the duration at which the power is consumed at $R_{peak}$ has reached $Dur_{max}$, or the burst period is complete.

Then, at 522, the method 500 determines if the power consumption at $R_{peak}$ was halted because the bucket was emptied. If so, the method 500 proceeds to 516 and consumes power at $R_{sust}$ until the burst period is complete at which point the method 500 terminates at 518. If power consumption was not halted because the bucket was empty, then either the burst period is complete or the duration at which the power is consumed at $R_{peak}$ has reached $Dur_{max}$, and in either event, the method 500 preferably terminates at 518. One of skill in the art will readily recognize that because of the restrictions within power budgeting method 500, some burst periods will be unable to achieve the target BER, resulting in a non-zero P(outage).

Figure 6:
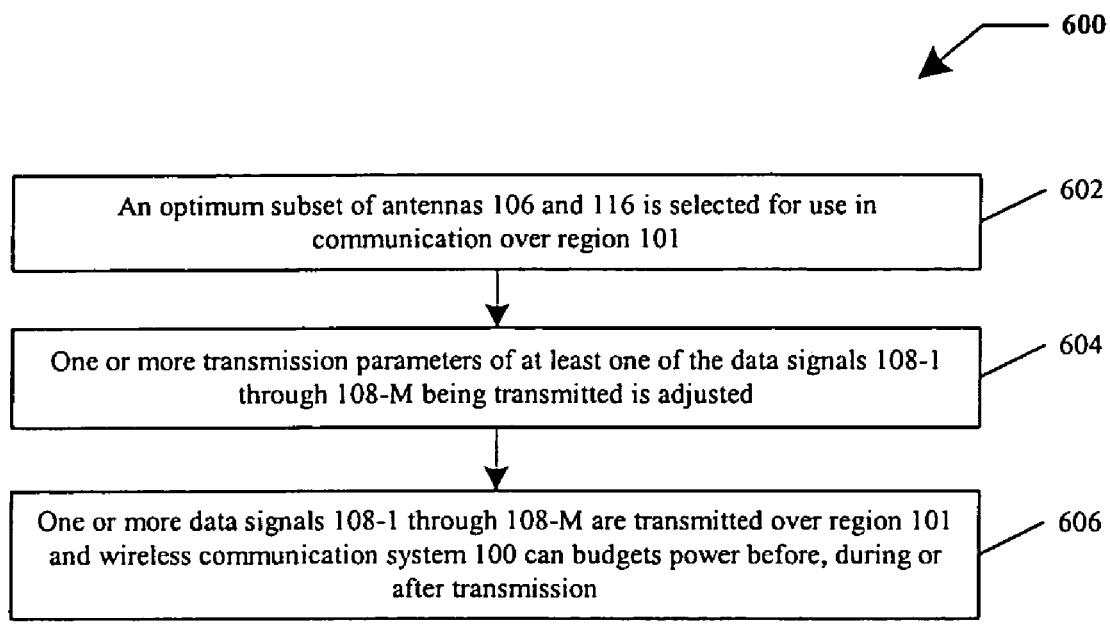
FIG. 6 a flow diagram depicting an exemplary method of allocating resources within another exemplary embodiment of the wireless communication system.

FIG. 6 depicts an exemplary method 600 of allocating resources within wireless communication system 100. At 602, an optimum subset of antennas 106 and 116 is selected for use in communication over region 101 using, for instance, exemplary methods 200, 300 or 400. Also, it should be noted that the subset of antennas 106 and 116 can include all antennas 106-1 through 106-M and 116-1 through 116-N. At 604, one or more transmission parameters of at least one of the data signals 108-1 through 108-M being transmitted is adjusted. The transmission parameters can include the power at which the data signal 108-1 through 108-M is transmitted, the bit rate at which the data signal 108-1 through 108-M is transmitted and the like. In one exemplary embodiment, the transmission parameters are preferably adjusted to a more optimal value using eq. (8) or (9). At 606, one or more data signals 108-1 through 108-M are transmitted over region 101. In one exemplary embodiment, wireless communication system 100 budgets power before, during or after transmission. One exemplary method that can be used to budget power is power budgeting method 500.

Additional exemplary embodiments of the systems and methods described herein are provided below in the context of exemplary simulations. These exemplary simulations are intended only to further illustrate the features, implementations, performance advantages and general operation of the systems and methods described herein. The simulations are presented in terms of numerical values and ranges that were chosen for convenience in the simulation, or that resulted from numerical values and ranges that were chosen for convenience in the simulation. Therefore, these exemplary simulations are not intended to, nor should they be used to, limit the systems and methods described herein.

Figure 7A:
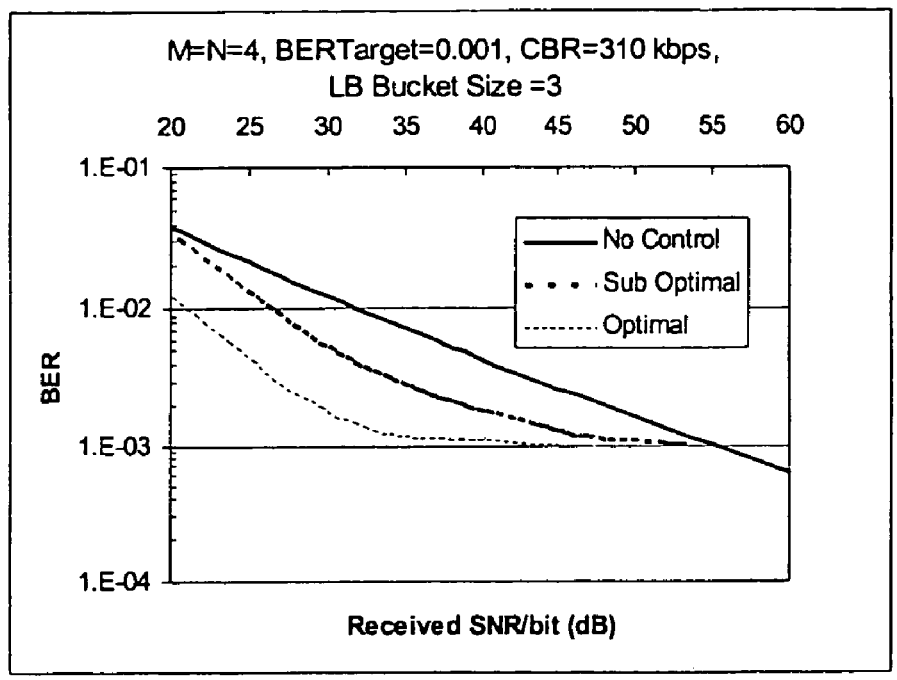
FIG. 7A is a graph depicting the BER performance of the no-control, sub-optimal and optimal schemes in another exemplary embodiment of the wireless communication system.
Figure 7B:
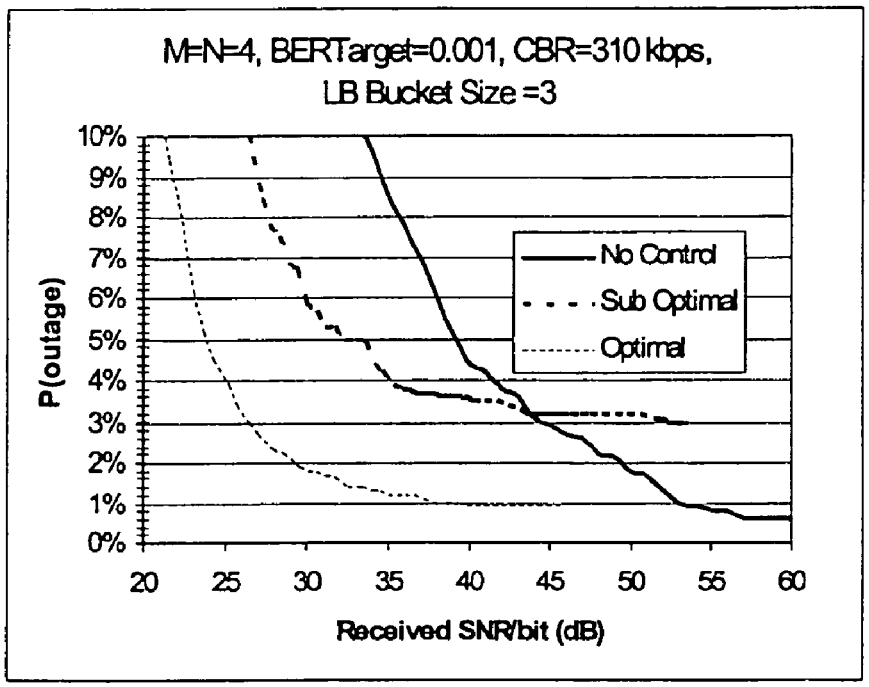
FIG. 7B is a graph depicting the P(outage) performance of the no-control, sub-optimal and optimal schemes in another exemplary embodiment of the wireless communication system.

In a first exemplary embodiment, a simulation study was conducted to verify the performance of the eqs. 1-8. Here, N and M were both set to four, $BER_{target}$ was chosen as $10^{-3}$ and the target rate of communication was a CBR bit rate of 310 kbps. Simulations were conducted for three resource control schemes: one using no adjustment of transmission parameters (referred to herein as "no-control"), one adjusting the transmission parameters with eq. (9) (referred to herein as "sub-optimal") and one adjusting the transmission parameters with eq. (8) (referred to herein as "optimal"). For each scheme, the received SNR/bit was increased from 20 dB until both the BER dropped below $10^{-3}$ and P(outage) dropped below $10^{-2}$. The SNR increase was accomplished by increasing the average power allocation in the leaky bucket parameters, i.e., $R_{sust}=Pwr_{ave}$. The maximum power allocation was restrained to be at most three times the average power level, i.e., $Pwr_{max}=R_{peak}=3\ Pwr_{ave}$. FIG. 7A is a graph depicting the differences in BER performance of these three schemes and FIG. 7B is a graph depicting the differences in P(outage) performance of these three schemes.

It can be observed that the optimal scheme achieved the BER and P(outage) targets with a received SNR/bit of around 45 dB, while the no-control scheme required 55 dB, translating into a 10 dB saving in power consumption. For the sub-optimal scheme, the BER performance was satisfactory, crossing the 0.001 BER line with a SNR/bit of 50 dB, which translates into a 5 dB saving. The BER did not decrease further, and the same is true for P(outage), which did not drop below 3%. This was because the sub-optimal scheme automatically reduced power allocation based on $BER_{target}$. Hence, even when more power was available, this scheme would not use more than was necessary. A similar situation was presented with the optimal scheme, which almost kept BER and P(outage) constant after a certain power consumption level was reached. Note that the relatively high SNR values result from the relatively high CBR target bit rate.

Figure 8A:
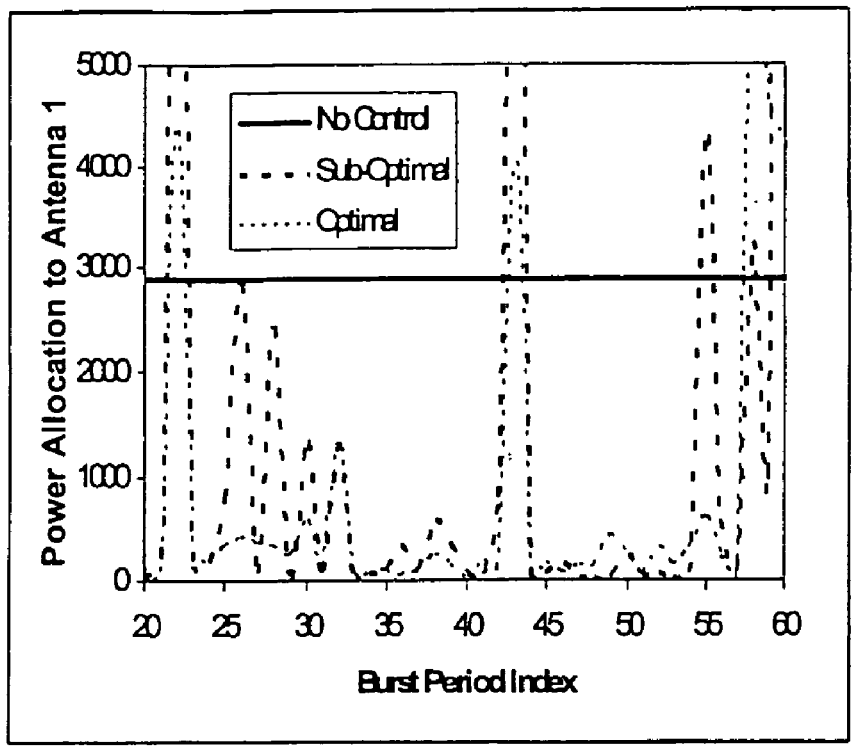
FIG. 8A is a graph depicting the power allocation to an in another exemplary embodiment of the wireless communication system.
Figure 8B:
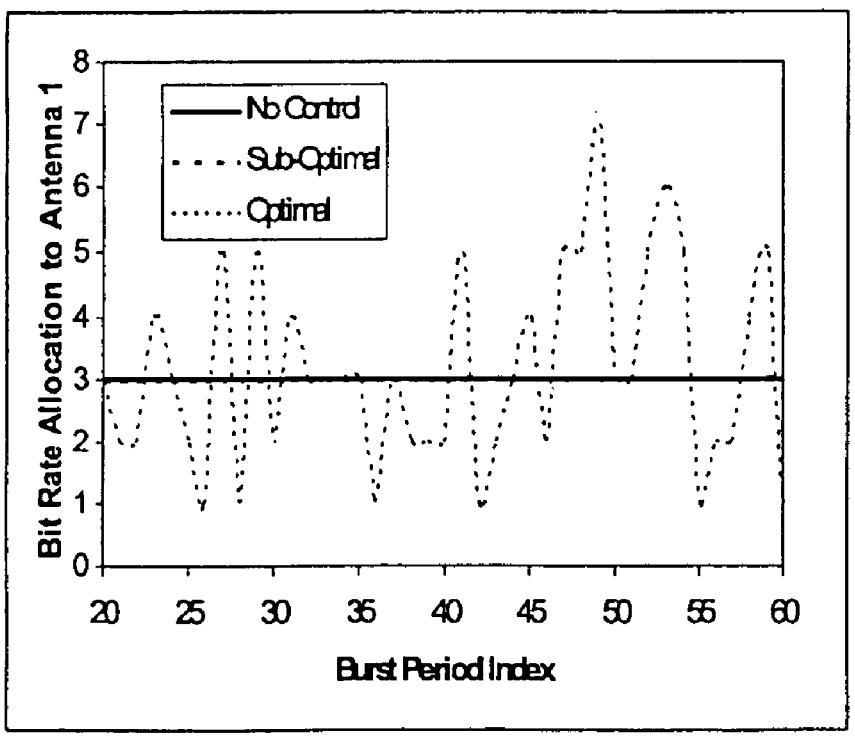
FIG. 8B is a graph depicting the bit rate at which a data signal is transmitted from an antenna in another exemplary embodiment of the wireless communication system.

FIGS. 8A-B depict an exemplary embodiment of a simulation of the power and bit rate dynamics, respectively, for sub-channel "1" as a function of time for a selected 40 burst periods when the average received SNR/bit was 40 dB. In this exemplary embodiment, power savings were mainly achieved from two scenarios. The first scenario is intra-period power saving as a result of allocating power saved from sub-channels with relatively higher fading to sub-channels with relatively less fading. The second scenario is inter-period power saving as a result of allocating power saved from periods with relatively less fading levels to periods with relatively higher fading levels. Exemplary embodiments of each are given below.

With regards to intra-period power saving, in the 65th burst period, the optimal scheme determined that the bit rate allocation to each antenna should be 0, 7, 0 and 5 bits per symbol, i.e., sub-channels "1" and "3" were not used because they experienced too much fading. The corresponding power allocations were 0, 1.6e+03, 0 and 1.5e+03, the sum of which is 3.2e+03, much less than the total allowable power of 1.03e+05. Thus, in this embodiment, the resultant BER was zero.

With the no-control scheme, each antenna 106-1 through 106-4 transmitted 3 bits per symbol and was allocated power of 1.03e+05/4=2.5e+04 to transmit the respective data signal 108-1 through 108-M. The resultant BERs in each sub-channel were 0, 0, 0.05 and 0 and the average BER was 0.011, much higher than $BER_{target}$. It was not optimal to use the third sub-channel, which wasted power of 2.5e+04.

With regard to the inter-period power saving, in the 180th period, the optimal scheme determined that the power allocation to each antenna 106-1 through 106-4 should be 4.9e+04, 9.4e+04, 7.3e+04 and 1.3e+05. Total power consumption was then 3.5e+05, higher than the average power of 1.03e+05. However, the previous two bursts periods consumed only 4.7e+03 and 2.3e+04, respectively, due to good conditions in region 101. The saved power, which was stored in the leaky bucket as tokens, was then used by this period to ensure low enough BER.

The no-control scheme simply allocated 1.03e+05÷4=2.5e+04 to each antenna 106-1 through 106-M. The resultant BERs in each sub-channel were 0.12, 0.05, 0.08 and 0, the average BER was 0.06, higher than $BER_{target}$.

Figure 9:
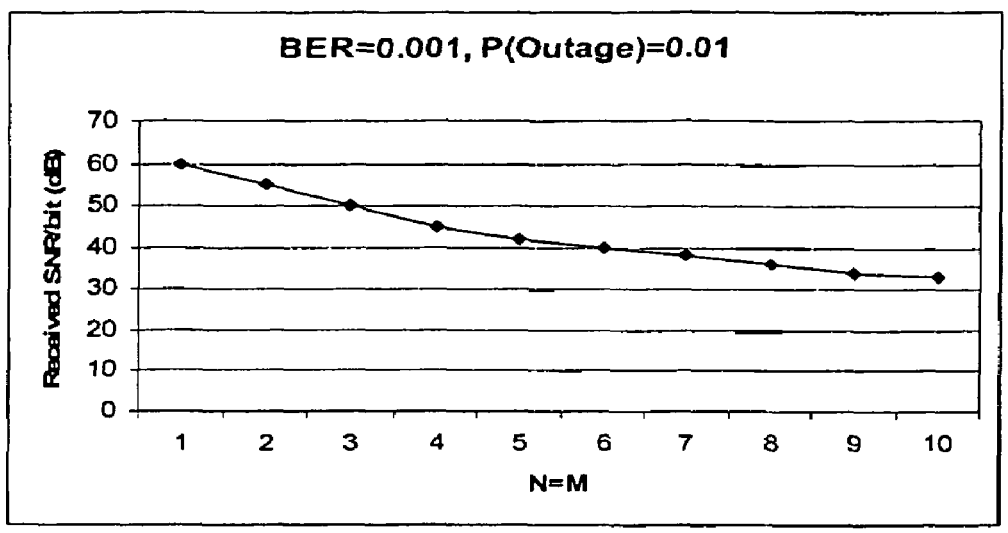
FIG. 9 is a graph depicting the effect of N and M on the optimal scheme in another exemplary embodiment of the wireless communication system.

In FIG. 9, the impact of N and M on the performance of system 100 using eq. (8) is depicted. It can be observed that as the number of antennas 106 and 116 increases, both the BER and P(Outage) were able to reach their target levels at decreasing SNR/bit values. In particular, when N=M=10, system 100 requires 10 dB less SNR to meet the targets. This demonstrates that more antennas 106 and 116 enjoy higher degree of the smoothing effect hence making adaptive control more effective.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit of the disclosure. Furthermore, it should also be understood that the features or characteristics of any embodiment described or depicted herein can be combined, mixed or exchanged with any other embodiment.

What is claimed is:

1. A wireless communication system, comprising:
   a transmit system comprising a first set of two or more antennas, the transmit system being configured to transmit a data signal from each of two or more of the antennas in the first set over a region; and
   a receive system comprising a second set of two or more antennas each configured to receive the two or more transmitted data signals, wherein the transmit system is configured to adjust a transmission parameter of at least one data signal based on the level of signal fading in the region to maintain a target communication bit rate;
   wherein the target communication bit rate of is a bit rate for a sustainable bit rate (SBR) conduit;
   wherein the transmit system is configured to adjust a first transmission parameter and a second transmission parameter, wherein the first transmission parameter is a power at which the data signal is transmitted and the second transmission parameter is a bit rate at which the data signal is transmitted;
   wherein the transmit system is configured to transmit the data signal in quadrature amplitude modulated (QAM) format and to adjust the second transmission parameter according to:

$$K_i = [\log_2(-\lambda) - \log_2(\text{const} \cdot \ln 2 \cdot [C^+C]_{ii}^{-1})]^+$$

wherein Ki is the number of bits represented by a QAM symbol sent from antenna i and is representative of the bit rate at which the data signal is transmitted from antenna i,
   wherein C is representative of the transfer matrix of the region, const is determined by:

$$\text{const} = -\ln(5\text{BER}_{target}) \cdot N_0/1.5$$

wherein $\text{BER}_{target}$ is a target bit error rate in the one or more transmitted data signals, $N_0$ is representative of the noise in the region and $\lambda$ is determined by:

$$\Sigma[\log_2(-\lambda) - \log_2(\text{const} \cdot \ln 2 \cdot [C^+C]_{ii}^{-1})]^+ = \text{target bit rate} \times T_{symbol\ period}$$

wherein $T_{symbol\ period}$ is the period of a symbol in the respective data signal, and wherein the transmit system is configured to adjust the first transmission parameter according to:

$$Es_i = \text{const} \cdot \left( \frac{-\lambda}{\text{const} \cdot \ln 2 \cdot [C^+C]_{ii}^{-1}} - 1 \right) \cdot [C^+C]_{ii}^{-1}$$
   $$= \frac{-\lambda}{\ln 2} - \text{const} \cdot [C^+C]_{ii}^{-1}$$

wherein $Es_i$ is representative of the power at which the data signal is transmitted from antenna i.

2. The system of claim 1, wherein the level of signal fading is determined by the level of multipath fading and the level of time-variable fading.

3. The system of claim 1, wherein the transmission parameter comprises a power at which at least one data signal is transmitted.

4. The system of claim 1, wherein the transmission parameter comprises a bit rate at which at least one data signal is transmitted.

5. The system of claim 1, wherein the transmit system is further configured to select a subset of antennas from the first set of antennas from which to transmit the data signals.

6. The system of claim 1, wherein the number of antennas in the second set of antennas is greater than or equal to the number of antennas in the first set of antennas.

7. The system of claim 1, wherein the transmit system is configured to budget power.

8. A wireless communication system, comprising:
   a transmit system comprising a first set of two or more antennas, the transmit system being configured to transmit a data signal from each of two or more of the antennas in the first set over a region; and
   a receive system comprising a second set of two or more antennas each configured to receive the two or more transmitted data signals, wherein the transmit system is configured to adjust a transmission parameter of at least one data signal based on the level of signal fading in the region to maintain a target communication bit rate;
   wherein the transmit system is configured to adjust a first transmission parameter and a second transmission parameter, wherein the first transmission parameter is a power at which the data signal is transmitted and the second transmission parameter is a bit rate at which the data signal is transmitted;
   wherein the transmission parameter is a power at which the data signal is transmitted and wherein the transmit system is configured to transmit the data signal in quadrature amplitude modulated (QAM) format and to adjust transmission parameter according to:

$$Es_i = \frac{-\ln(5BER_{target}) \cdot N_0}{1.5} \cdot (L-1) \cdot [C^+C]_{ii}^{-1}$$

wherein $Es_i$ is representative of the power at which the data signal is transmitted from antenna i $BER_{target}$ is a target bit error rate in the data signal, C is representative of the transfer matrix of the region, $N_0$ is representative of the noise in the region and L is the target bit rate divided by the number of antennas used for transmission in the first set.

9. A wireless communication system, comprising:
   a transmit system comprising a first set of two or more antennas, the transmit system being configured to transmit a data signal from each of two or more of the antennas in the first set over a region; and
   a receive system comprising a second set of two or more antennas each configured to receive the two or more transmitted data signals, wherein the transmit system is configured to adjust a power at which at least one data signal is transmitted and a bit rate at which at least one data signal is transmitted based on a level of signal fading in the region;
   wherein the transmit system is configured to adjust the power and bit rate to maintain a target rate of communication;
   wherein the target rate of communication is a bit rate for a sustainable bit rate (SBR) conduit;
   wherein the transmit system is configured to transmit the data signal in quadrature amplitude modulated (QAM) format and to adjust the second transmission parameter according to:

$$K_i = [\log_2(-\lambda) - \log_2(\text{const} \cdot \ln 2 \cdot [C^+C]_{ii}^{-1})]^+$$

wherein Ki is the number of bits represented by a QAM symbol sent from antenna i and is representative of a bit rate at which the data signal is transmitted from antenna i, wherein C is representative of the transfer matrix of the region, const is determined by:

$$\text{const} = -\ln(5\text{BER}_{target}) \cdot N_0 / 1.5$$

wherein $\text{BER}_{target}$ is a target bit error rate in the one or more transmitted data signals, $N_0$ is representative of the noise in the region and $\lambda$ is determined by:

$$\Sigma[\log_2(-\lambda) - \log_2(\text{const} \cdot \ln 2 \cdot [C^+C]_{ii}^{-1})]^+ = \text{target bit rate} \times T_{symbol\ period}$$

wherein $T_{symbol\ period}$ is the period of a symbol in the respective data signal, and wherein the transmit system is configured to adjust the first transmission parameter according to:

$$Es_i = \text{const} \cdot \left( \frac{-\lambda}{\text{const} \cdot \ln 2 \cdot [C^+C]_{ii}^{-1}} - 1 \right) \cdot [C^+C]_{ii}^{-1}$$

$$= \frac{-\lambda}{\ln 2} - \text{const} \cdot [C^+C]_{ii}^{-1}$$

wherein $Es_i$ is representative of the power at which the data signal is transmitted from antenna i.

10. The system of claim 9, wherein the transmit system is further configured to select a subset of antennas from the first set of antennas from which to transmit the data signals.

11. The system of claim 9, wherein the number of antennas in the second set of antennas is greater than or equal to the number of antennas in the first set of antennas.

12. A wireless communication system, comprising:

a transmit system comprising a first set of two or more antennas, the transmit system being configured to transmit a data signal from each of two or more of the antennas in the first set over a region; and a receive system comprising a second set of two or more antennas each configured to receive the two or more transmitted data signals, wherein the transmit system is configured to adjust a power at which at least one data signal is transmitted and a bit rate at which at least one data signal is transmitted based on a level of signal fading in the region;

wherein the transmit system is configured to adjust the power and bit rate to maintain a target rate of communication;

wherein the target rate of communication is a bit rate for a sustainable bit rate (SBR) conduit;

wherein the transmission parameter is a power at which the data signal is transmitted and wherein the transmit system is configured to transmit the data signals in quadrature amplitude modulated (QAM) format and to adjust the power at which at least one data signal is transmitted according to:

$$Es_i = \frac{-\ln(5BER_{target}) \cdot N_0}{1.5} \cdot (L-1) \cdot [C^+C]_{ii}^{-1}$$

wherein $Es_i$ is representative of the power at which the data signal is transmitted from antenna i, $BER_{target}$ is a target bit error rate in the data signal, C is representative of the transfer matrix of the region, $N_0$ is representative of the noise in the region and L is the target bit rate divided by the number of antennas used for transmission in the first set.

13. A wireless communication system, comprising:

a transmit system comprising a first set of two or more antennas each configured to transmit a data signal over a region; and a receive system comprising a second set of two or more antennas each configured to receive the transmitted data signals from the first set of antennas, wherein the transmit system is configured to select a subset of two or more antennas from the first set based on the level of signal fading in the region and transmit at least one data signal from each antenna in the subset;

wherein the transmit system is configured to select the subset of antennas to maintain a target rate of communication;

wherein the target rate of communication is a bit rate for a sustainable bit rate (SBR) conduit;

wherein the transmit system is configured to adjust a power at which the data signal is transmitted and a bit rate at which the data signal is transmitted, and wherein the transmit system is configured to transmit the data signal in quadrature amplitude modulated (QAM) format and to adjust the bit rate according to:

$$K_i = [\log_2(-\lambda) - \log_2(\text{const} \cdot ln2 \cdot [C^+C]_{ii}^{-1})]^+$$

wherein Ki is the number of bits represented by a QAM symbol sent from antenna i and is representative of the bit rate at which the data signal is transmitted from antenna i, wherein C is representative of the transfer matrix of the region, const is determined by:

$$\text{const} = -ln(5\text{BER}_{target}) \cdot N_0 / 1.5$$

wherein $\text{BER}_{target}$ is a target bit error rate in the one or more transmitted data signals, $N_0$ is representative of the noise in the region and $\lambda$ is determined by:

$$\Sigma[\log_2(-\lambda) - \log_2(\text{const} \cdot ln2 \cdot [C^+C]_{ii}^{-1})]^+ = \text{CBR target bit rate} \times T_{symbol\ period}$$

wherein $T_{symbol\ period}$ is the period of a symbol in the respective data signal, and wherein the transmit system is configured to adjust the power according to:

$$Es_i = \text{const} \cdot \left( \frac{-\lambda}{\text{const} \cdot \ln 2 \cdot [C^+C]_{ii}^{-1}} - 1 \right) \cdot [C^+C]_{ii}^{-1} = \frac{-\lambda}{\ln 2} - \text{const} \cdot [C^+C]_{ii}^{-1}$$

wherein $Es_i$, is representative of the power at which the data signal is transmitted from antenna i.

14. The system of claim 13, wherein the subset is a first subset and the receive system is further configured to select a second subset of two or more antennas from the second set based on the level of signal fading in the region and use the second subset of antennas to receive the transmitted data signals.

15. The system of claim 13, wherein the transmit system is further configured to adjust a transmission parameter of at least one data signal based on the level of signal fading in the region.

16. The system of claim 13, wherein the transmission parameter is a first transmission parameter comprising a power at which the data signal is transmitted and wherein the transmit system is further configured to adjust a second transmission parameter comprising a bit rate at which the data signal is transmitted.

17. A wireless communication system, comprising:
- a transmit system comprising a first set of two or more antennas each configured to transmit a data signal over a region; and
- a receive system comprising a second set of two or more antennas each configured to receive the transmitted data signals from the first set of antennas,
- wherein the transmit system is configured to select a subset of two or more antennas from the first set based on the level of signal fading in the region and transmit at least one data signal from each antenna in the subset;
- wherein the transmit system is configured to select the subset of antennas to maintain a target rate of communication;
- wherein the target rate of communication is a bit rate for a sustainable bit rate (SBR) conduit;
- wherein the transmission parameter is a power allocation to the antenna and wherein the transmit system is configured to transmit the data signal in quadrature amplitude modulated (QAM) format and to adjust the transmission parameter according to:

$$Es_i = \frac{-\ln(5 BER_{target}) \cdot N_0}{1.5} \cdot (L-1) \cdot [C^+ C]_{ii}^{-1}$$

wherein $Es_i$, is representative of the power at which the data signal is transmitted from antenna i, $BER_{target}$ is a target bit error rate in the data signal, C is representative of the transfer matrix of the region, $N_0$ is representative of the noise in the region and L is a target bit rate divided by the number of antennas used for transmission in the first set.

* * * * *